United States Patent [19]  [11] 3,727,024
Bell, Jr.  [45] Apr. 10, 1973

[54] ELECTRICAL DISCHARGE MACHINING SERVO CONTROL CIRCUIT

[75] Inventor: Oliver A. Bell, Jr., Mooresville, N.C.

[73] Assignee: Elox Inc., Davidson, N.C.

[22] Filed: Aug. 12, 1971

[21] Appl. No.: 171,263

[52] U.S. Cl. ............................................. 219/69 G
[51] Int. Cl. .............................................. B23p 1/14
[58] Field of Search ............... 219/69 C, 69 G, 69 P

[56] References Cited

UNITED STATES PATENTS 3,558,844   4/1968   Lobur ............................. 219/69 G Primary Examiner—R. F. Staubly
Attorney—Robert C. Hauke et al.

[57] ABSTRACT

A servo feed control circuit in which servo feed control of the cutting operation is related to gap electrical parameter during machine pulse on-time. A gap voltage sensing network is connected to an electrical servo feed means through a field effect transistor, which transistor in turn is rendered conductive through a keying arrangement effective during machining pulse on-time only.

5 Claims, 4 Drawing Figures

PATENTED APR 10 1973

3,727,024

GAP VOLTAGE PULSES

KEY PULSES

CAPACITOR 48 VOLTAGE

INVENTOR
OLIVER A. BELL, JR.

BY Hauke, Gifford & Patalidis

ATTORNEYS

ELECTRICAL DISCHARGE MACHINING SERVO CONTROL CIRCUIT

BACKGROUND OF THE INVENTION

Field of the Invention

In prior art gap sensing networks for electrical discharge machining servo feed control, such as peak storage networks and gap voltage averaging networks, there is typically included a capacitor and a decay resistor. During low duty factor, that is, very narrow on-time as compared to off-time, the ratio of the stored charge to the decay time requires frequent adjustment of the reference voltage by the operator. The present invention largely eliminates this requirement. The present invention further represents an improvement related to the circuit disclosed and claimed in Lobur U. S. Pat. No. 3,558,844 for "Electrical Discharge Machining Servo Control Circuit", which patent is of common ownership the present application.

SUMMARY OF THE INVENTION

The invention provides a servo feed circuit for electrical discharge machining in which gap connection is practically eliminated between the occurrence of actual machining power pulses across the gap. The final condition of the last prior striking machining pulse is held until the next following machining pulse resets a new gap voltage level.

BRIEF DESCRIPTION OF THE DRAWINGS

The drawings show the invention as it is incorporated in an electrical discharge machining power supply, wherein.

DESCRIPTION OF THE PREFERRED EMBODIMENT

Figure 2:
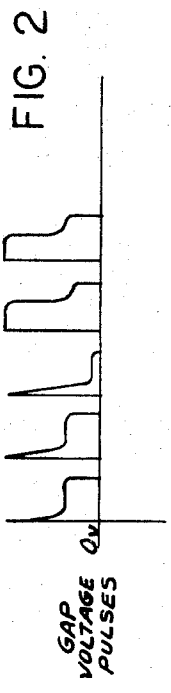
FIG. 2 is a gap voltage waveform diagram.

In the interest of brevity, the power supply circuit has been simplified in the manner shown. In a typical electrical discharge machining power supply circuit, an electronic switch or bank of switches, such as transistor 10, is connected with a main machining power supply 12, a tool electrode 16 and an electrically conductive workpiece 14. A constant flow of dielectric coolant is maintained through the gap to wash away eroded particles as the machining process continues. In the present instance, the transistor 10 is representative of a bank of parallel-connected transistors of a number depending upon the power output required. Transistor 10 has its principal electrodes, collector and emitter, coupled as shown between the negative terminal of the power supply 12 and the gap, so that the polarity of the electrode 16 is negative relative to the workpiece 14. The base of the transistor 10 is triggered by suitable pulses from an appropriate pulse generator circuit. Such a pulse generator, which is shown in block form, may include for example a multi-vibrator stage 18 and one or more intermediate drive stages 20, one of which is operated in phase with the output switch-transistor 10. The gap also may be shunted by a load resistance such as the resistor 22. The control of cutting current passed to the gap may be regulated by a variable resistor 24, which resistor is normally connected in series with the tool electrode 12.

In the present embodiment, the servo control system has been simplified to show the basic electrically operated element, such as a servo valve coil 26, which is used to control the system to provide relative movement between the electrode 16 and the workpiece 14 in a manner well known in the electrical discharge machining art.

It will be noted that my servo feed control circuit is equally adaptable to servo control systems of the electrical motor driven type in which a motor control winding would be subjected to electrical control in the same manner as the servo coil 26. There are two signal inputs provided at the left hand side of the servo control circuit which include the gap voltage signal received through a sensing lead 28 and the keying signal provided through a keying lead 30. The keying signal lead 30 is shown connected at the upper terminal of the series resistor 24. Alternately, it may be connected in the dash line configuration shown to the preceding drive stage 20 of the power supply circuit, the only requirement being that the signal be derived at a point where there is a change in polarity in phase with each machining power pulse. The significance of this will be further shown and explained hereinafter, particularly in connection with the showing of FIGS. 2 and 3. The gap voltage signal through the sensing lead 28 passes through a voltage divider, including resistors 32 and 34 to a following buffer stage, which stage includes transistors 36 and 38. Transistors 36 and 38 have their respective collectors in series with resistors 37 and 39 and DC voltage source as shown. This buffer stage provides a low output impedance and a high input impedance. A following series resistor 40 is a current limiting resistor that holds current to a level within the capability of a field effect transistor 42. The gate of the field effect transistor 42 is connected to the keying pulse source through the lead 30 and through a parallel network, including a diode 44 and a capacitor 46. The basic function of the field effect transistor 42 is to operate as an analog switch which opens during the machining pulse off-time and closes during the machining pulse on-time. This gating action occurs responsive to the keying square wave pulses being applied to the gate of the field effect transistor 42. It will be seen that the diode 44 is phased to prevent passage of any gate current when the keying signal goes positive. A storage capacitor 48 is connected in the circuit as shown. During the gap machining power pulse on-time, the capacitor 48 either charges or discharges through the field effect transistor 42 and the resistor 40 to a voltage level which is proportional to the gap voltage signal provided through the lead 28. During the gap off-time, the field effect transistor 42 is gated to its off-state and capacitor 48 holds its voltage charge because of the exceedingly high impedance of the field effect transistor 42. The next following stage includes an operational amplifier 50 with a gain adjustment available through a resistor 52. The operational amplifier 50 is operated in a voltage follower configuration so that it offers a relatively high impedance and forces the capacitor 48 to discharge only into the field effect transistor 42. It will be noted that the field effect transistor 42 may be either P-channel or N-channel in type. A second operational amplifier 54 is included in the circuit to provide the proper gain to operate the servo valve through its coil 26. A variable reference voltage for the operational amplifier 54 is provided through a fixed series resistor 60 and a potentiometer 62. A variable resistor 64 and fixed resistor 65 provide an adjustable gain for the operational amplifier 54, while series current limiting resistors 66 and 68 are included in the circuit as shown. A function of the buffer stage, including the transistors 56 and 58 like that of the earlier described buffer stage, is to provide a low output impedance and high input impedance in the circuit.

Figure 3:
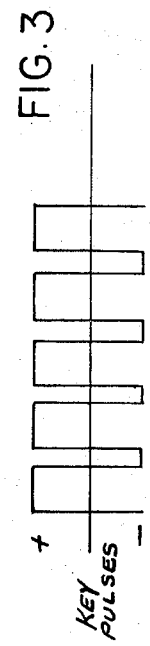
FIG. 3 is a waveform diagram of the keying pulses employed.
Figure 4:
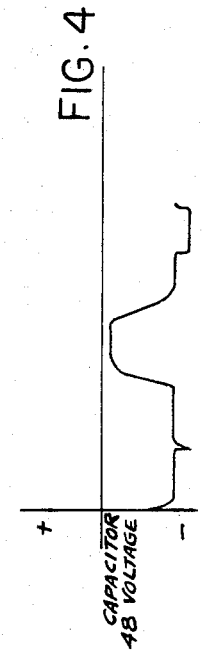
FIG. 4 is a voltage waveform diagram showing the voltage level stored on capacitor 48.
Figure 1:
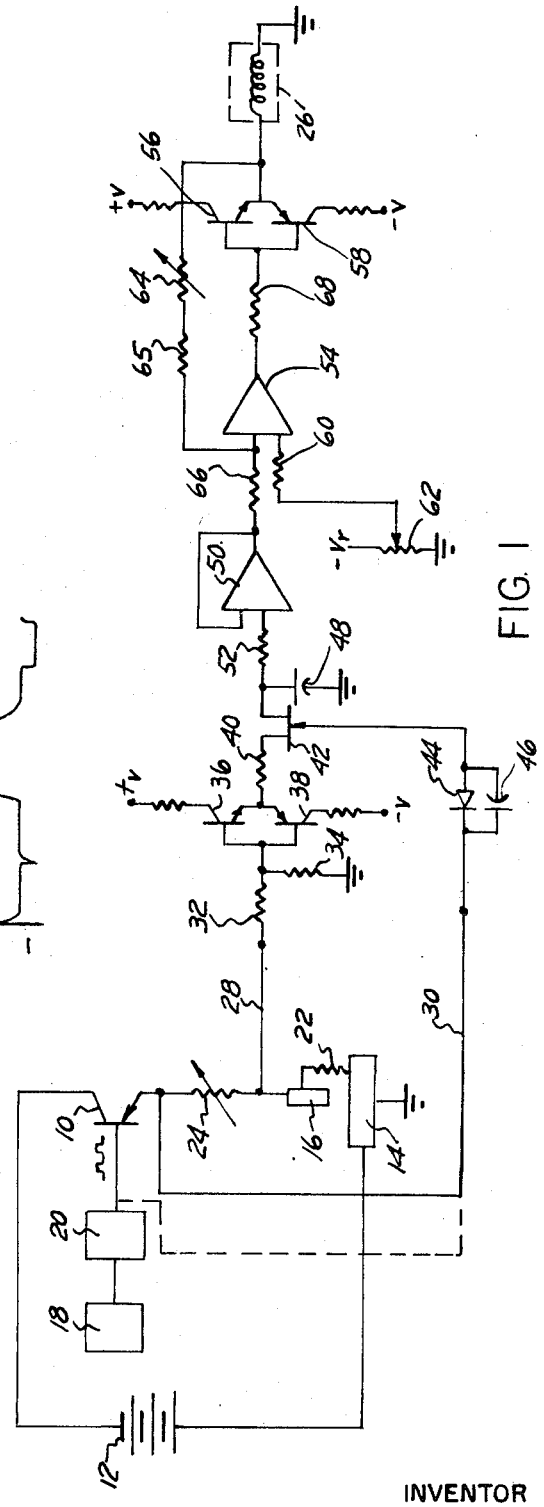
FIG. 1 is a combined schematic and diagrammatic showing of the invention.

The circuit further is of a configuration and has a mode of operation that permits the storage capacitor to follow the input pulse during the on-time directly to render the circuit relatively independent of those happenings in the gap which occur during pulse off-time. FIG. 2 shows the gap voltage excursions during each machining power pulse. Each of the keying pulses shown in FIG. 3 is shown in phase with its corresponding machining power pulse. This timing relationship is shown as between FIGS. 2 and 3. The voltage levels of storage capacitor 48 are shown in FIG. 4 with changes and fluctuations occurring only during machining pulse on-time.

It will thus be seen that I have provided by my invention a novel and improved servo feed control circuit for electrical discharge machines.

I claim as my invention:

1. A servo feed control circuit for use with an electrical discharge machining apparatus wherein workpiece material is removed by a tool electrode from a workpiece across a dielectric coolant filled gap including an electronic output switch connected between the power supply and said gap for providing machining power pulses to said gap at presettable on-off times and frequencies, a keying network connected to an intermediate drive stage for said output switch for providing a keying signal during pulse on-time, sensing means connected to said gap for providing a gap voltage signal representative of gap spacing, and an electrically operated servo feed means operatively connected to said networks for providing relative movement between said electrode and said workpiece responsive to said signals, wherein the improvement comprises: a field effect transistor having its current conducting electrodes operatively connected between said sensing network and one terminal of said electrically operated servo feed means, said keying network operatively connected to the gate electrode of said field effect transistor for rendering it conductive during machining pulse on-time.

2. The combination as set forth in claim 1 wherein a storage capacitor is included having one terminal connected to one current conducting electrode of said field effect transistor.

3. The combination as set forth in claim 2 wherein said keying network includes a parallel diode and capacitor network operatively connected between said drive stage and said gate electrode of said field effect transistor.

4. The combination as set forth in claim 3 wherein an operational amplifier of high input impedance is connected to said terminal of said storage capacitor and wherein a reference voltage source is operatively connected to said operational amplifier for providing it with a selectively variable reference voltage.

5. A servo feed control circuit for use in conjunction with an electrical discharge machining apparatus wherein workpiece material is removed by a tool electrode from the workpiece across a dielectric coolant filled gap including an electronic output switch connected between a power supply and said gap for providing machining power pulses to said gap at preset on-off times and frequency, a gap voltage sensing network operatively connected to said gap for providing a voltage signal representative of gap spacing, and an electrically operated servo feed means for providing relative movement between said electrode and said workpiece, wherein the improvement comprises: a field effect transistor having its current conducting electrodes connected between said sensing network and said electrically operated servo feed means; and wherein a separate keying network including a parallel diode-capacitor combination is operably connected to said output switch for rendering said field effect transistor conductive during machining pulse on-time only.

* * * * *